UNITED STATES PATENT OFFICE.

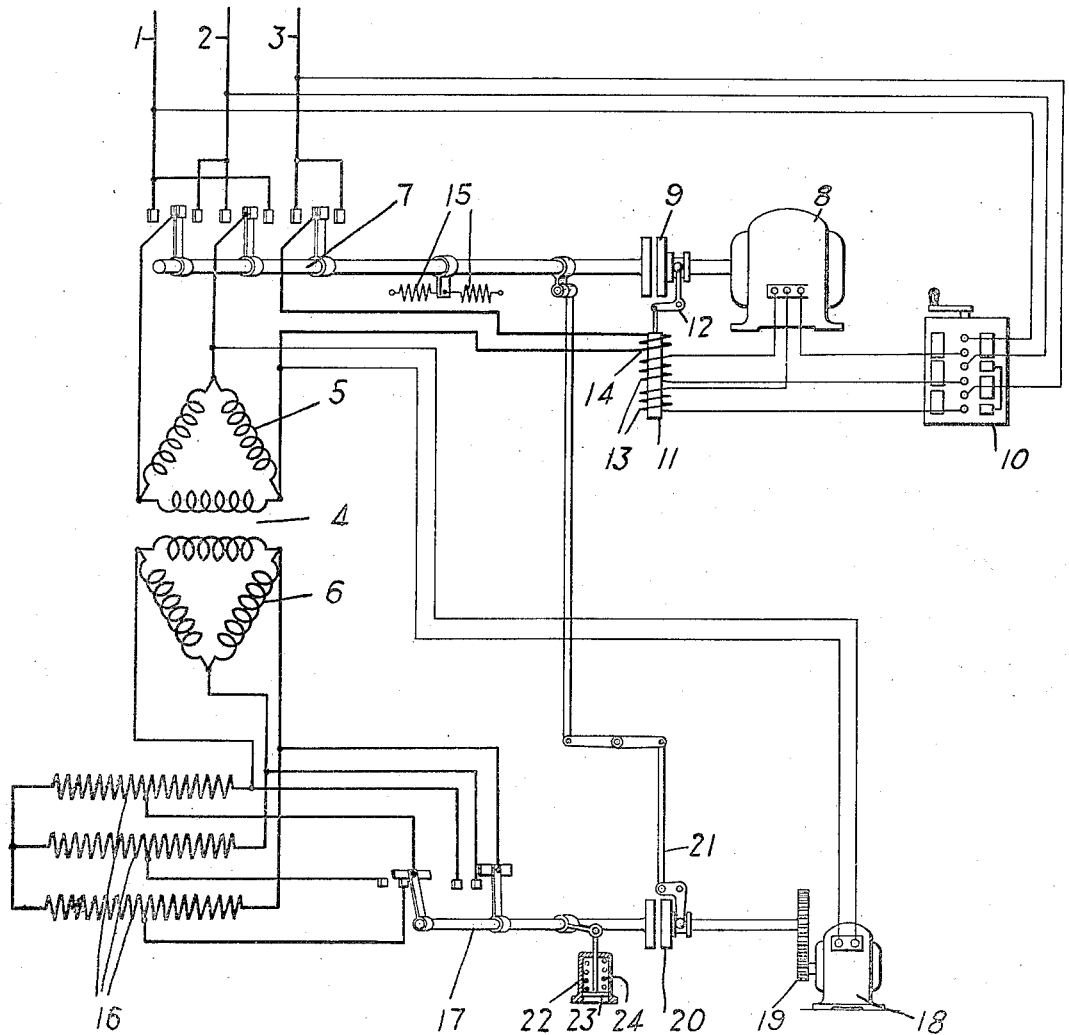

HENRY D. JAMES, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,330,589.  Specification of Letters Patent.  Patented Feb. 10, 1920.

Application filed April 29, 1915. Serial No. 24,711.

*To all whom it may concern:*

Be it known that I, HENRY D. JAMES, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and particularly to such systems as embody means for controlling the circuits of the windings of alternating-current motors.

My invention has for one of its objects to provide an arrangement whereby the circuits of the primary and secondary windings of an electric motor may be controlled automatically.

A second object of my invention is to provide a simple and efficient means whereby the circuits of the secondary windings of an electric motor are controlled in accordance with the electrical connections of the primary windings.

According to the present invention, I provide switching mechanisms for controlling the circuits of the respective windings of an alternating-current motor which may be actuated by electric motors or other suitable power devices. The switches are connected to their respective actuating devices by means of clutches. A controller operates to simultaneously energize the motor for actuating the main or primary switch and to energize an electromagnet which controls the clutch for operatively connecting the main switch to its actuating motor. The closure of the main switch operates to simultaneously complete a circuit for the motor for operating the secondary switch and to actuate the clutch for operatively connecting the latter switch to its actuating motor.

The details of my invention will be described in connection with the accompanying drawing in which the single figure is a diagrammatic view of circuits and apparatus embodying my invention.

Line conductors 1, 2 and 3, which may be connected to any suitable source of alternating current, supply energy to an alternating-current motor 4 having primary windings 5 and secondary windings 6. The circuit connections of the primary windings 5 are controlled by a main reversing switch 7 that is adapted to be actuated by a motor 8 to which it is operatively connected by means of a clutch 9.

The circuit of the motor 8 and the direction in which it rotates are controlled by a controller 10. An electromagnet for controlling the clutch 9 comprises a core member 11 that is connected to one of the clutch members by a bell-crank lever 12, two coils 13 that are in series with the motor 8, and a coil 14 that is in series with the primary windings 5. Springs 15 operate to effect the return of the switch 7 to its illustrated or "off" position whenever the clutch 9 is disengaged.

Resistors 16 are respectively in circuit with each of the phases of the secondary winding 6. The resistors 16 are adapted to be shunted by a switching mechanism 17 that is actuated by a motor 18 to which it is operatively connected by means of gear mechanism 19 and a clutch 20. The clutch 20 is connected to the switch 7 by a lever mechanism 21 which effects the operative connection of the clutch when the switch 7 is moved in either direction from its "off" position. The operation of the switch 17 is controlled by a time-element device which is, preferably, a dash pot 22 comprising a piston 23 for insuring a relatively slow movement of the switch 17 in closing, and a spring 24 for producing a rapid movement in opening, the switch.

It may be assumed that the several parts occupy their respective inoperative or illustrated positions. To start the main motor 4, the handle of the controller 10 is actuated in either direction from its "off" position to close the circuit of the motor 8 through the coils 13. The coils 13 are thus energized to draw the core member 11 downwardly and effect the operative connection of the clutch 9 which connects the motor 8 to the switch 7.

It may be assumed, for example, that the motor 8 actuates the switch 7 in a counter-clockwise direction, as viewed from the left in the drawing, to connect the primary winding 5 in circuit with the line conductors 1, 2 and 3. The closure of the switch 7 operates, through the link mechanism 21, to connect the members of the clutch 20. The circuit of the motor 18 is completed by the closure of the main switch 7, and the switch 17 is then closed to gradually cut out the resistors 16, the movement of the switch 17 being retarded by the dash pot 22.

The switches 7 and 17 will remain in their closed positions as long as the controller 10 is in an operative position. The motors 8 and 18 operate as torque motors to oppose the force of the respective springs 15 and 24 which tend to return the switches to their inoperative positions. The clutch 9 is held in its closed position by the force of the coils 13, while the clutch 20 is maintained in its closed position by reason of its mechanical connection to the main switch 7.

When the handle of the controller 10 is actuated to its "Off" position, the shunt coils 13 are deënergized, and the series coil 14, which is wound to oppose the coils 13, actuates the core member 11 upwardly to effect the disconnection of the clutch 9. The springs 15 then return the switch 7 to its inoperative position to open the circuit of the primary windings 5. The opening of the switch 7 operates to simultaneously disconnect the members of the clutch 20, open the circuit of the motor 18, and deënergize the series coil 14. The switch 17 is returned to its inoperative position by the spring 24, the dash pot offering no resistance to a rapid movement of these parts in this direction.

Upon the actuation of the handle of the controller 10 to its other operative position, the connections of the motor 8 are reversed and it will accordingly rotate in the opposite direction. The clutch 9 will be closed in the manner above described, and the main switch 7 will be rotated in a clockwise direction to complete the circuits of the windings 5. The main motor 4 will then be connected for rotation in the opposite direction. The motor 18, which actuates the secondary switch 17, will rotate in the same direction as that above described, since it is a single-phase motor, for example, of the series type. It will be obvious, however, that a motor having any suitable number of phases, may be employed without changing the operation of the several parts. The operation of the several parts differs in no other material respect from that described above in connection with the circuits as first established for the main motor.

Among other advantages, it may be noted that the system above described operates to control the circuits of the primary and secondary windings of an electric motor entirely automatically, upon the actuation of a single controlling device. The actuation of the primary switch in either direction from a neutral position effects the operation of the secondary switch to gradually remove resistance from the secondary circuit for accelerating the motor. The secondary switch is quickly and automatically returned to its starting position upon the opening of the primary circuit.

The provision of the series coil for controlling one of the clutches insures that the main switch will open immediately upon the actuation of the controller to open the circuit of its actuating motor. The arrangement of the clutches between the switches and their respective motors permits the practically instantaneous opening of the switches upon the actuation of the controller to its inoperative position. This operation would not be possible if the motors were permanently connected to the switches, because of the great inertia of the parts to be moved.

It will be understood that modifications will occur to those skilled in the art to which my invention appertains and that such changes as fall within the scope of the appended claims may be made without departing from the spirit of my invention.

I claim as my invention:

1. In a motor-control system, the combination with an electric motor having primary and secondary windings, of a switch for controlling the circuits of said primary windings, means for yieldingly retaining said switch in an intermediate position, and a switching mechanism electrically and mechanically controlled by said switch for controlling the circuits of said secondary winding.

2. In a motor-control system, the combination with an electric motor having primary and secondary windings, of a reversing switch for controlling the circuits of said primary windings, said reversing switch having a normal inoperative position, a switch for controlling the resistances of the circuits of said secondary windings, and electro-responsive means in circuit with said reversing switch for actuating the second switch upon the actuation of the first switch in either direction from its inoperative position.

3. In a motor-control system, the combination with an electric motor having primary and secondary windings, a main switch for connecting said primary windings to a source of current, means for biasing said switch to an inoperative position, and a switch for controlling the resistances of the circuits of said secondary winding, of dynamo-electric means controlled by said main switch for actuating the secondary switch.

4. In a motor-control system, the combination with an electric motor having primary and secondary windings, a main switch for connecting said primary windings to a source of current, and a switch for controlling the resistances of the circuits of said secondary winding, of electro-responsive means controlled by said main switch for actuating the secondary switch, and mechanical means controlled by the main switch, for connecting said actuating means to said secondary switch.

5. In a motor-control system, the combination with an electric motor having primary and secondary windings, of a switch for controlling the circuits of said primary windings, a power device for actuating said switch, but normally disconnected therefrom, a switch for controlling the circuits of said secondary windings, a power device for actuating the secondary switch, but normally disconnected therefrom, and means for successively connecting the primary switch and the secondary switch to their respective actuating devices, closing the primary switch and closing the secondary switch.

6. In a motor-control system, the combination with an electric motor having primary and secondary windings, of a switch for controlling the circuits of said primary winding, a switch for controlling the circuits of said secondary winding, an actuating device for each of said switches, and a clutch for connecting the secondary switch to its actuating device, said clutch being controlled in accordance with the position of the primary switch.

7. In a motor-control system, the combination with an electric motor having primary and secondary windings, a double-throw switch for controlling the circuits of said primary winding, and a switch for controlling the resistances of the circuits of said secondary winding, of electro-responsive devices for actuating said switches, means for controlling the actuation of the double-throw switch and means operable upon the movement of the double-throw switch in either direction for connecting the other switch to its actuating device.

8. In a motor-control system, the combination with an electric motor having primary and secondary windings, and a plurality of switches for controlling the circuits of said windings, of means for actuating one of said switches in accordance with the position of the other, and means for automatically returning said switches to inoperative positions.

9. The combination with an electric motor and a switch for controlling the circuit of said motor, of a power device for actuating said switch, a clutch, means for simultaneously energizing said power device and actuating said clutch to connect said switch to said power device, and means in circuit with said motor for disconnecting said clutch upon the deënergization of said power device.

10. In a motor-control system, the combination with an electric motor, and a switch for connecting said motor to a source of current, of means for controlling said switch, said means comprising a power device, means for operatively connecting said power device to said switch, means for simultaneously controlling said power device and said connecting means, and means tending to disconnect said power device from said switch when the latter is in operative position only.

11. The combination with an alternating-current motor having primary and secondary windings, and a switching mechanism for controlling each of said windings, of a motor for controlling each of said mechanisms, and means for controlling the sequence of operation of said motors, said means comprising one of said switching mechanisms.

12. The combination with an alternating current motor having primary and sceondary windings, and a switching mechanism for controlling each of said windings, of a motor for controlling each of said mechanisms, a clutch for connecting each of said mechanisms to the corresponding controlling motor, and means comprising one of said mechanisms for controlling the sequence of operation of said controlling motors.

13. The combination with an alternating-current motor having primary and secondary windings, and a switching mechanism for controlling each of said windings, of a motor for controlling each of said mechanisms, a clutch for connecting each of said mechanisms to the corresponding controlling motor, means for simultaneously controlling one of said controlling motors and the corresponding clutch, and means for thereupon simultaneously controlling the other of said controlling motors and the corresponding clutch.

14. The combination with a pair of switches, a motor for controlling each of said switches, and a clutch for connecting each of said switches to the corresponding motor, of means controlled by one of said clutches for controlling said other clutch.

In testimony whereof, I have hereunto subscribed my name this 24th day of April, 1915.

HENRY D. JAMES.